United States Patent [19]

D'Hont

[11] Patent Number: 5,408,243

[45] Date of Patent: Apr. 18, 1995

[54] METHOD FOR PRODUCING A FLAT FLEXIBLE ANTENNA

[75] Inventor: Loek D'Hont, Almelo, Netherlands

[73] Assignee: Texas Instruments Incorporated, Dallas, Tex.

[21] Appl. No.: 4,362

[22] Filed: Jan. 14, 1993

[30] Foreign Application Priority Data

Feb. 5, 1992 [NL] Netherlands .................. 9220331

[51] Int. Cl.$^6$ ..................... H01Q 1/00; H01Q 7/08
[52] U.S. Cl. ..................... 343/718; 343/787; 343/788; 29/600; 29/DIG. 95
[58] Field of Search ............... 343/718, 787, 788, 795; 29/600, DIG. 31, DIG. 95, DIG. 40; H01Q 1/12, 1/44, 1/00, 7/08

[56] References Cited

U.S. PATENT DOCUMENTS

| | | | |
|---|---|---|---|
| 1,523,798 | 1/1925 | Benson et al. | 343/788 |
| 2,316,623 | 4/1943 | Roberts | 343/788 |
| 4,947,179 | 8/1990 | Ganter et al. | 343/718 |
| 5,159,347 | 10/1992 | Osterwalder | 343/787 |
| 5,220,339 | 6/1993 | Matsushita | 343/787 |

*Primary Examiner*—Donald Hajec
*Assistant Examiner*—Hoanganh Le
*Attorney, Agent, or Firm*—Ira S. Matsil; James C. Kesterson; Richard L. Donaldson

[57] ABSTRACT

Apparatus and method for producing a flexible antenna suitable to be incorporated in a badge or similar object. The antenna comprises electrical windings (28, 38) surrounding a flexible antenna core (26, 36). The antenna core (26, 36) is of a material having a high quality factor formed of a plurality of mutually insulated, longitudinally extending chains of magnetic soft material of high $\mu$. According to one embodiment, a powder of small particles of a magnetic soft material of high $\mu$ is mixed with a synthetic resin so that a high saturation of magnetic material in the mixture is formed in a vacuum. The mixture is cured in a strong magnetic field so that the particles form chains (18A, 18B, 18C) of the particle parallel to the applied magnetic field.

3 Claims, 2 Drawing Sheets

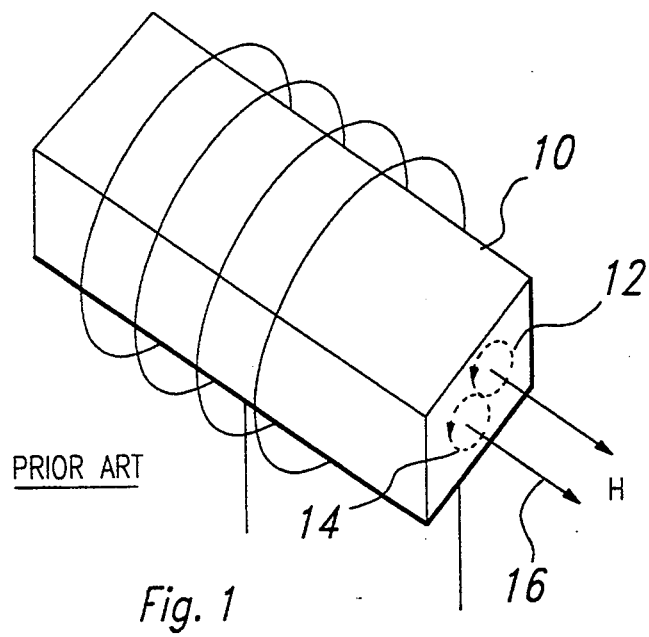
PRIOR ART
Fig. 1
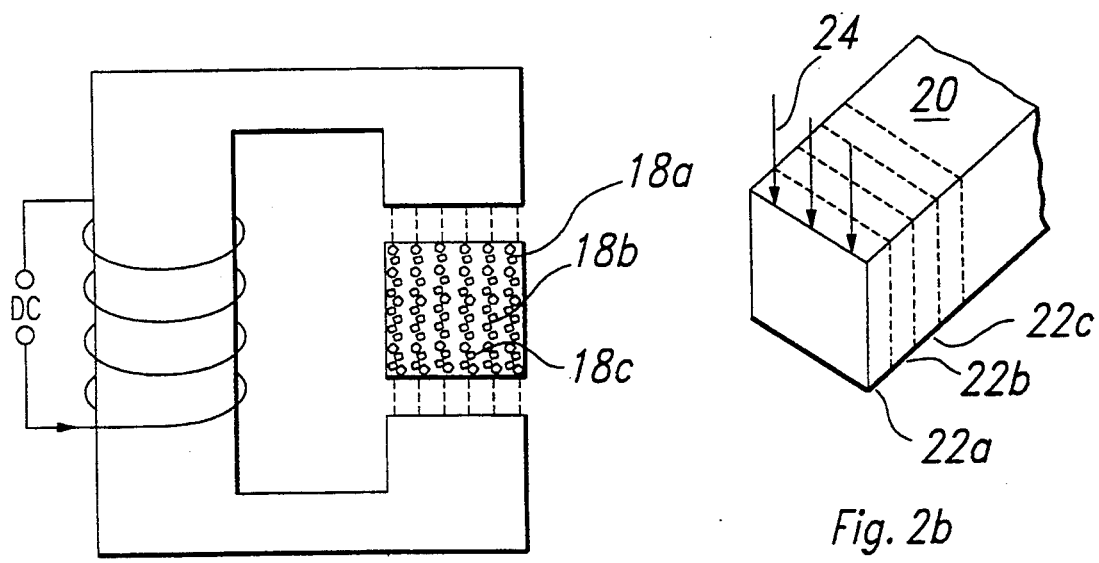
Fig. 2a
Fig. 2b
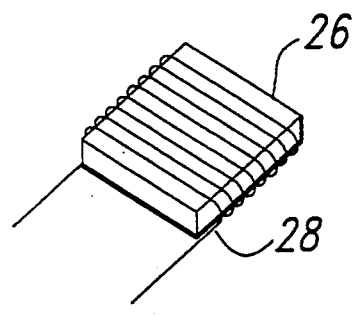
Fig. 3

METHOD FOR PRODUCING A FLAT FLEXIBLE ANTENNA

FIELD OF THE INVENTION

The invention relates to a method for producing a flexible magnetic antenna core for a chip transponder to be incorporated in a badge or similar object, which antenna core is of a material with a high quality factor and low magnetic losses.

BACKGROUND OF THE INVENTION

In the art of identifying objects or animals, increasing use is recently being made of chip transponders having an associated small antenna. Recently chip transponders have come into use which are placed in a badge, card or similar flexible sheet. An antenna for use in this application must in general have a flat and flexible magnetic core around which the antenna winding may be fitted, and yet have a high quality factor to provide specific antenna characteristics. The ferrite elements which have been used in the past are relatively hard and insufficiently flexible so that consequently, they will break when bent.

SUMMARY OF THE INVENTION

It is an object of this invention to provide a method for producing such a flexible magnetic antenna core which has low losses and a sufficiently high quality factor in order to provide the required antenna radiation characteristics.

This is achieved in a method according to the invention as indicated above such that as a magnetic antenna core, an elongated strip of mutually insulated, longitudinally stretched chains of magnetic soft material of high $\mu$ is formed.

In one aspect, the method involves forming said chains of thin wires made of magnetic soft iron and covered with an insulating layer and forming these wires into a flat bundle or strip. Around this strip-shaped core, an electrical winding is formed.

In another aspect the method involves forming said chains of thin strips made of amorphous alloy and covered by an insulating layer. Around a single such strip or a plurality of stacked such strips an electrical winding is then formed.

In yet another aspect, the method involves forming a powder from small particles of magnetic soft material of high $\mu$, mixing this powder with a synthetic resin so that a high saturation of magnetic material in the mixture is obtained in a vacuum, and that the mixture is allowed to cure in block-shaped form while being exposed to a strong static magnetic field which causes particles to form chains which will remain parallel to the applied magnetic field. From the block, and in parallel with the chain direction, flat strips will subsequently be cut.

BRIEF DESCRIPTION OF THE DRAWINGS

Some embodiments of the invention will now be explained in more detail referring to the drawings, in which:

FIG. 1 shows a view in perspective of a block of metal in which the orientation of the H-field and eddy currents are indicated;

FIG. 2a is a diagrammatic view of a device for curing a mixture of powder of magnetic soft material and synthetic resin while being in a strong magnetic field;

FIG. 2b shows a front view of a block of such a mixture placed in such a static field;

FIG. 3 shows a view in perspective of a strip-shaped antenna core cut from the block of FIG. 2b in a longitudinal direction and fitted with an electrical winding, as a first embodiment of the invention;

DESCRIPTION OF THE PREFERRED EMBODIMENTS

Figure 4:
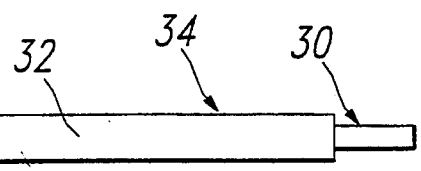
FIG. 4 shows a view of a single thin wire of magnetic soft iron which has an insulating layer.

In producing a flat and flexible antenna core, one will preferably attempt to produce a basic strip of chains of magnetic soft material of high $\mu$ around which the electrical winding is to be wound. With such a strip it is a problem that the magnetic properties of the chains with the highest permeability are effected by the distance between the magnetic particles in each chain parallel to the longitudinal axis of the magnetic inductor. For a good magnetic conduction, that is for optimized magnetic antenna characteristics, it is required that the magnetic particles are arranged with the smallest possible spacing between each other. Another requirement is, that transverse to the longitudinal direction of the strip axis, there needs to be a distance between particles so that they will not be in electrical contact with each other. Thereby eddy currents, which otherwise would form in the material during use as an antenna, will be limited to a minimum so that the antenna losses are low or the quality factor is high. In Prior Art FIG. 1, an example is given of a fixed metal core 10 which, if used for an antenna, would give rise to eddy currents 12 and 14. These eddy currents develop at right angles to the H-field indicated by reference number 16 and will therefore cause considerable losses and a low quality factor. Therefore, an optimum antenna design has within the strip, magnetic particles arranged with the smallest possible spacing between each other in the longitudinal direction of the strip axis, and insulation between the strips, perpendicular to the longitudinal direction of the strip axis.

In one aspect of the method according to the invention, a powder of small particles of ferrite or another magnetic soft iron material of high $\mu$ is formed. This powder is mixed with a synthetic resin so that a high saturation of magnetic material in the mixture is obtained. The mixing is performed in a vacuum in order to avoid the presence of air cavities in the material after curing.

In order to obtain a mixture in which the magnetic particles in the longitudinal direction of the particles are as close together as possible, the mixture is cured while being in a strong static magnetic field. This is performed in a device as indicated in FIG. 2a. By applying a strong static magnetic field, the magnetic particles in the mixture are arranged end to end in chains as indicated at 18A, 18B and 18C, parallel to the H-field lines. After curing, the field is removed and the chains 18A, 18B and 18C which were formed in parallel to the previously applied field remain. Next, the resulting block 20 is cut into strips 22A, 22B and 22C following a direction of cutting which is parallel to the direction of the previously applied H-field 24, as indicated in FIG. 2b. Finally, flat strip-shaped cores of cured soft magnetic material of high μ are obtained as indicated by reference number 26 in FIG. 3. Around each strip, an electrical winding 28 is formed.

In another aspect of the method according to the invention, an elongated strip-shaped core is formed of thin wires 30 h of soft magnetic iron and covered with an insulating layer 32, each of which wires form a chain as described above. FIG. 4 shows such an insulated wire 34. Subsequently, a number of these wires is formed into a flat bundle-shaped strip 36 of which FIG. 5a and 5b, respectively, provide a plan view and a cross-sectional view. This cross-sectional view shows in outline in what manner the wires in this strip are stacked beside each other and in top of each other. Around the strip-shaped core an electrical winding 38 is formed as described above.

Figure 5A:
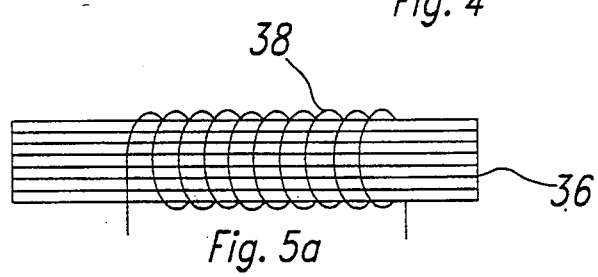
FIGS. 5a and 5b respectively show a plan view and a cross-sectional view of a flat bundle-shaped strip of a number of wires of FIG. 5; which represents an antenna core fitted with an electrical embodiment according to the invention.
Figure 5B:
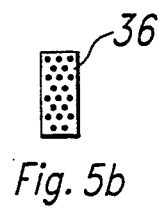
Figure 6:
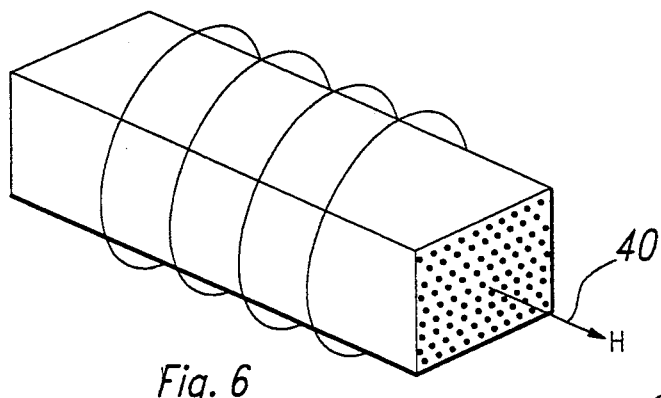
FIG. 6 shows a view in perspective of such a strip-shaped antenna core, as indicated in FIG. 5, with the H-field and without eddy currents.

In FIG. 6, a view comparable to that of FIG. 1 is provided of the flat strip of FIG. 5 with the orientation of the H-field 40, which indicates that no more eddy currents occur.

Figure 7:
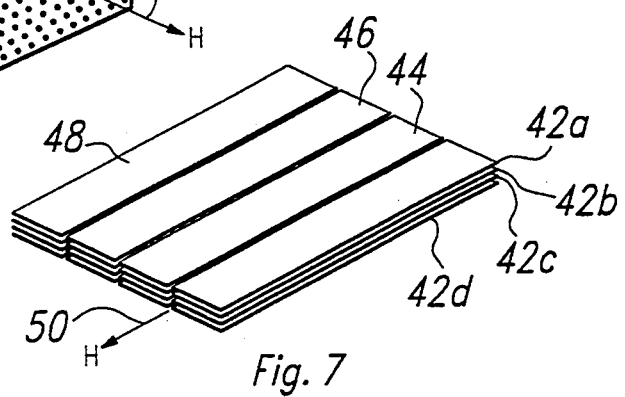
FIG. 7 shows a view of a stacked number of strips of amorphous alloy which represents a variant of the antenna core of FIG. 6.

With a variant of the strip-shaped antenna core of FIG. 5 as indicated in FIG. 7, thin insulated strips 42A, 42B, 42C and 42D of amorphous alloy are used as the magnetic core instead of wires of soft iron covered with an insulating layer. The reasons for using this alloy are the relatively low induction losses with higher operational frequencies as compared to those of soft iron, a good mechanical flexibility and resistance against bending, a high initial magnetic permeability, and the fact that the magnetic properties are not effected by mechanical stress.

The high initial permeability factor of the alloy results in a very stable effective permeability of the rod in the eventual antenna application. Because of the high permeability, the effective or "rod" permeability in the antenna application will only depend on mechanical core tolerances. Thereby any variation in permeability, caused by badge variables in the production of the alloy or dependency on operational temperatures, are eliminated. Another useful characteristic of this amorphous alloy is its high stability of magnetic parameters when subjected to mechanical forces such as bending. This stability is considerably better in comparison with that of other magnetic materials. The aforementioned characteristics of the material will provide a flat transponder antenna with characteristics that meet the practical requirements in a considerable degree and also provide very good reproducibility for mass production.

In FIG. 7, and as discussed above a perspective view is provided of some stacks of thin insulated layers of an amorphous alloy. During this stacking and alignment, the proper orientation of one amorphous strip to another needs to be maintained because the magnetic properties of this material are sensitive to the "magnetic" orientation of field as indicated in FIG. 7. In addition, as with the individual wires of the antenna core, the strip-shaped layers in FIG. 7 in a single stack and in adjacent stacks 44, 46 and 48 are electrically insulated from each other in order to prevent magnetic core losses resulting from eddy currents. These eddy currents are normally perpendicular to the H-field 50, as indicated in FIG. 1, and the insulation between the layers will reduce these eddy currents. Therefore, a combination of strips of amorphous metals, parallel to each other as with the embodiment with metal fibers or wires, may be used whereby the eddy currents will be reduced even further.

For example, if the insulated strips of amorphous alloy are 50 mm long, 20 μm thick and 12 mm wide, and are stacked such that the stack is still 50 mm long and 12 mm wide but greater than 20 μm thick, the resultant core displays a rather low quality performance and is lossy. If, however, the width of the strip is cut from 12 mm to 2 or 3 mm, the quality performance of the core is enhanced greatly. Furthermore, the more narrow the strips, the higher the quality performance. This phenomena supports the abovementioned principle which states that to maintain eddy currents at a minimum, the strips must not be wide in the transverse direction, perpendicular to the longitudinal direction of the strip axis, which would facilitate the rise of eddy currents. Rather, thousands of individual insulated amorphous fibers formed into a flat bundle-shaped strip as is shown in FIG. 5a with wires, would be an optimum flexible antenna design.

The insulation between the strips of one stack may be realized by placing thin, foil-shaped, non-conducting materials, such as plastics, between the amorphous layers. Also, one surface on one side of the alloy strip may be treated chemically, for example oxidized, so that they become highly resistant to electric current and provide a barrier for eddy currents which are induced in the cross section of the core, perpendicular to the H-field. The insulation between the adjacent stacks may be realized by maintaining some spacing between these stacks.

Figure 8A:
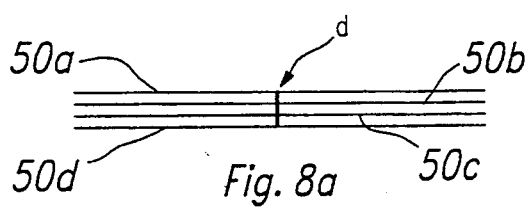
FIGS. 8a to 8c show examples of the interconnection of the strips in the stack of FIG. 7.
Figure 8B:
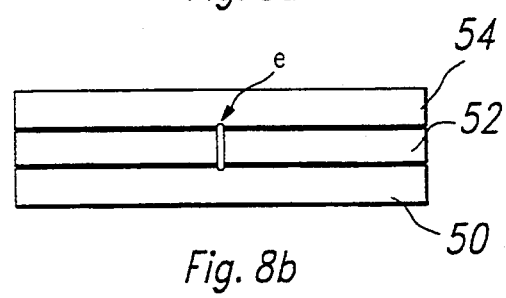
Figure 8C:
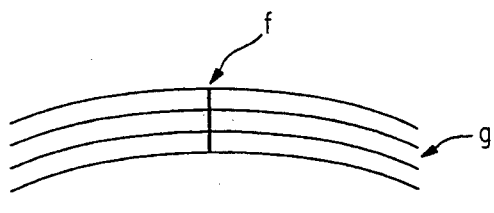

The strips also need to be stacked in a special way so that the entire package will not lose its flexibility, neither longitudinally nor in its transverse direction, as, for example, is indicated in FIG. 8. FIG. 8a provides in outline a side view of four strips 50A, 50B, 50C and 50D, stacked on top of each other, and of the way in which in the middle area "d" of the strips are mechanically attached to each other so that the ends may move freely with respect to each other. FIG. 8b provides in outline a top view of three adjacent and mutually insulated stacks of strips 50, 52 and 54, which stacks in the middle area "e", on the upper and lower side, ape attached to each other. In dependence of the application, one of mope adjacent stacks (i.e. like three stacks in FIG. 8b) are used. Around the whole a winding is wound. In FIG. 8c it is indicated how these ends "g" may move with respect to each other and thereby ensure the flexibility of the strip-shaped core. During this movement, the middle area "f" maintains its position. For linking together the central areas of the strips an adhesive may be used of linking techniques such as point welding or ultrasonic welding. As long as the area of the point or area linkage remains small, the increase of the eddy currents in this area in cross section will be marginal.

Advantageously, the method described above provides a flat and flexible antenna which has a high quality factor and is very suitable for application as an antenna for a transponder in, for example, a badge or credit card or a similar object.

What is claimed is:

1. A method for producing a flexible antenna comprising the steps of:
   forming a flexible antenna core from a plurality of longitudinally extending chains of magnetic soft material maintained in a fixed relationship with each other, said step of forming a flexible antenna core comprising the steps of:
   mixing a powder of small particles of magnetic material with a synthetic resin in a vacuum;
   placing said mixture in a static magnetic field to arrange said particles end to end in chains parallel to said field, said chain of particles being electrically insulated from each other by said resin;
   curing said mixture to bond and maintain said particles in said chains; and
   removing said magnetic field;
   and
   surrounding said flexible antenna core with electrical windings.

2. The method of claim 1 wherein said mixture of particles and resin is formed in the shape of a block and further comprising the step of cutting said block into thin strips along a longitudinal direction corresponding to the direction of the previously applied magnetic field to form a plurality of flexible magnetic cores.

3. A flexible antenna formed by the process of claim 1.

* * * * *